United States Patent [19]

Imaizumi et al.

[11] Patent Number: 5,314,969

[45] Date of Patent: May 24, 1994

[54] POLYESTER SHEET

[75] Inventors: Mitsuhiro Imaizumi; Masataka Kotani; Haruhiko Kondo; Takeshi Iwasa, all of Kawasaki; Eiichiro Takiyama, Kamakura, all of Japan

[73] Assignee: Showa Highpolymer Co., Ltd., Tokyo, Japan

[21] Appl. No.: 49,447

[22] Filed: Apr. 20, 1993

[30] Foreign Application Priority Data

May 11, 1992 [JP] Japan ................... 4-117658
May 13, 1992 [JP] Japan ................... 4-120784
May 13, 1992 [JP] Japan ................... 4-120785

[51] Int. Cl.$^5$ .............................. C08F 20/00
[52] U.S. Cl. ..................... 525/440; 528/272; 528/296; 528/300; 528/301; 528/302; 528/307; 525/437
[58] Field of Search ........... 528/272, 296, 300, 301, 528/302, 307; 525/437, 440

[56] References Cited

U.S. PATENT DOCUMENTS

| | | | |
|---|---|---|---|
| 2,999,851 | 9/1961 | Elmer | 528/83 |
| 4,041,208 | 8/1977 | Seeger et al. | 428/424 |
| 4,057,537 | 11/1977 | Sinclair | 528/354 |
| 4,076,798 | 2/1978 | Casey et al. | 424/22 |
| 4,166,873 | 9/1979 | Gilliam | 428/35 |
| 5,068,143 | 11/1991 | Agger et al. | 428/241 |

FOREIGN PATENT DOCUMENTS

| | | |
|---|---|---|
| 0323700 | 7/1989 | European Pat. Off. |
| 0393819 | 10/1990 | European Pat. Off. |
| 0448294 | 9/1991 | European Pat. Off. |
| 869243 | 1/1942 | France . |
| 1059075 | 3/1954 | France . |
| 1102420 | 10/1955 | France . |
| 748872 | 5/1956 | United Kingdom . |

*Primary Examiner*—Samuel A. Acquah
*Attorney, Agent, or Firm*—Sughrue, Mion, Zinn, Macpeak & Seas

[57] ABSTRACT

A sheet formed by using as a main component an aliphatic polyester having a melt viscosity of $1.0 \times 10^3 - 1.0 \times 10^6$ poises at a temperature of 190° C. and a shear rate of 100 sec$^{-1}$, and having a melting point of 70°–190° C. The sheet of the present invention is biodegraded when buried in soil and is excellent in mechanical properties and transparency. The sheet is also superior in non-absorbency of aroma as well as heat-sealability and formability.

9 Claims, No Drawings

POLYESTER SHEET

BACKGROUND OF THE INVENTION

1. Field of the Invention

The present invention relates to polyester sheet having excellent heat stability and mechanical strength which are prepared by using aliphatic polyesters with biodegradability and sufficiently high molecular weights and specific melt properties for practical use.

Further, the present invention relates to polyester stretched sheet formed by using the above aliphatic polyesters.

Furthermore, the present invention relates to polyester sheet having low affinity to aromatic substances. More particularly, the present invention relates to a sheet suitable as a material for packaging raw materials, intermediate or finish products, such as food and cosmetics, that contain aroma substances.

2. Discussion of the Background

Recently, with the expansion of the packaging industry, an increasing amount of plastics is being used to form various packaging materials. As a result, people have become very much concerned about the danger that the resulting waste from the increasing amount of plastics may pollute rivers, oceans and soil. To prevent such pollution the development of biodegradable plastics has been desired; for example, poly(3-hydroxybutylate) produced by fermentation methods using microorganisms, blends of general-purpose plastics and starch, a naturally occurring polymer, and the like are already known. The former polymer has a drawback in that it is poor in molding properties because the polymer has a heat decomposition temperature close to its melting point and a raw material efficiency is very bad because it is produced by microorganisms. On the other hand, since the naturally occurring polymer of the latter does not by itself have thermoplasticity, the polymer has defects in molding properties, and is greatly limited in its range of application.

On the other hand, although it is known that aliphatic polyesters are biodegradable, they have hardly been used because polymeric material sufficient enough to obtain practical molded product cannot be obtained. Recently, it has been found that a ring-opening polymerization of ε-caprolactone produces a higher molecular weight polymer, and proposed to use the polymer as a biodegradable resin. However, the resulting polymer is limited to only special applications because of a low melting point of 62° C. and a high cost thereof. Further, although glycolic acid, lactic acid and the like are polymerized by a ring-opening polymerization of glycolide and lactide thereof to obtain polymers with higher molecular weights so as to be sometimes used as medical fibers and the like, the polymers are not used in great amounts as packaging materials because their decomposition temperatures are close to their melting point and they have defects in their molding properties.

Although most of these are applied to plastic sheet, it is no exaggeration to say that high molecular weight polyesters (referring to polyesters having number-average molecular weights of at least 10,000) generally used for the plastics are limited to polyethylene terephthalate, a condensate of terephthalic acid (including dimethyl terephthalate) and ethylene glycol. Although there are cases of 2,6-naphthalenedicarboxylic acid being used instead of terephthalic acid, there are no reports of trials which obtained polymers with biodegradability.

Therefore, it is safe to say that there has been no concept of trying to make the sheet in practical use by injection molding using biodegradable aliphatic polyesters in which aliphatic dicarboxylic acid was used One of the reasons why this application concept has not been thought of is felt to be that in spite of the required special molding conditions and physical properties for the above sheet, most of the above-mentioned aliphatic polyesters have melting points of 100° C. or lower even if they are crystalline, and have poor heat stability when melted above that. Of further importance is that the properties, particularly mechanical properties such as tensile strength, of these aliphatic polyesters show markedly poor values even when they are the same level of number-average molecular weight as the above-mentioned polyethylene terephthalete, so just conceiving that the molded articles having required strength and the like would be obtained was difficult.

Another reason seems to be that studies for improving the physical properties of the aliphatic polyesters by increasing their number-average molecular weights have not been sufficiently advanced because of their poor heat stability.

Aroma substances are an important factor for increasing the commercial value of many products, for example, foods, cosmetics, detergents, paints, adhesives, tea, coffee and spices.

Many foods contain very small amounts of various aromatic substances. The proportion of aroma substances contained in a food are specifically fixed so as to provide an aroma characteristic to the food. A variety of aroma substances are added to many commercial products so as to enhance the aromas thereof or add extra aroma thereto, thus increasing the commercial values thereof.

Many organic compounds are known as aroma substances, for example: terpene hydrocarbons such as p-menthane, pinene, d-limonene, myrcene, terpinene, carene, sabinene, and β-caryophyllene; terpene alcohol compounds such as geraniol, nerol, citronellol, terbineol, linalol, menthol, nerolidol and borneol, and esters thereof; terpene aldehyde compounds such as ciral and citronellal; alcohols such as octanol, benzine alcohol and eugenol; esters such as ethyl caproate, amyl benzoate and ethyl cinnamate; and many others.

The products containing such aroma substances are packaged by using packaging materials made of glass, metal or synthetic resins when stored, transported and sold. Particularly, packaging and/or container materials employing synthetic resin sheets and thermally-formed containers are used as simple packaging and/or container materials to pack many commercial products because these packaging materials can be easily produced due to advances in multi-layer and heat-seal techniques and because the packaging and/or container materials are inexpensive, facilitate automatic packaging and decorative printing thereon, and completely barriers oxygen and moisture.

However, many synthetic resin sheets used to form the above-mentioned packaging materials rapidly absorb large amounts of aroma substances added to or originally contained in the products packaged therewith, so the products packaged therewith lose their aroma and commercial values.

Further, because these synthetic resin sheets absorb different aroma substances at different absorption rates, a synthetic resin sheet packaging a product may take up certain aroma components over the other aroma components from the product. If this happens, the aroma of products made up of a certain combination of many aroma substances change, thus significantly reducing the commercial value of the product.

The term "absorption" means a phenomena in which aroma substances move out of a packaged product and dissolve and diffuse into the synthetic resin of the packaging material or a phenomena in which aroma substances in a solution move out therefrom and dissolve and diffuse into the synthetic resin.

The relations between synthetic resins and aroma holding and absorption of aroma substances are described by, for example, Watanabe Wataru et al. in Nihon Shokuhin Kogyo Gakkai-shi, 10, No. 4, p. 118 (1963), a special issue of Shokuhin Kogyo, Shokuhin no Housou to Zairyo, Korin (1980), by Boda Shigeyuki in Japan Food Science, p. 49 (March, 1987), and by Preceedings of Future—Pak '87 (Ryder Association Inc.) Nov. 9-11 (1987).

Various methods related to containment of aroma are known, for example: a method in which a layer to be in contact with a product packaged with the sheet (the innermost layer) is formed of any one or more of polyethylene terephthalate, ethylene-vinyl alcohol copolymer and nylon (Japanese Patent Application Laid-open Nos. 57-163654 and 60-48344); a method in which a mixture of polyester and polyamide is used to form the innermost layer (Japanese Patent Application Laid-open No. 61-64449); a method in which ethylene-vinyl alcohol copolymer is laminated on a corona-treated or flame-treated low-density polyethylene laminated on a paper board (Japanese Patent Application Laid-open No. 63-3950); and a method in which ethylene-vinyl alcohol copolymer is laminated on an adhesive layer formed on polyolefin, the ethylene-vinyl alcohol copolymer being used as a heat-seal layer (Japanese Utility Model Application Laid-open No. 63-21031). However, any of these methods has problems in that the polymer has a higher melting point and poorer heat-seal characteristic and is more brittle than polyolefin.

A different type of method is proposed (for example, in Japanese Patent Application Laid-open Nos. 59-174348 and 59-174470), in which method the resin forming the innermost layer has been mixed with aroma substances that are expected to be absorbed therein. However, when food aroma substances for food are mixed with the innermost layer resin, the aroma substances deteriorate due to heat, or the mixing proportions of the aroma substances change, thus resulting in an aroma different from the aroma of the product to be packaged.

Polyolefin resins, such as polypropylene, intermediate or low-pressure polyethylene, high-pressure polyethylene, or ethylene-vinyl acetate copolymer (referred to as "EVA" hereinafter), which have good heat-seal characteristics and good moisture blocking characteristics, strongly absorb terpene hydrocarbons but do not substantially absorb alcohol or ester aroma substances; in particular, they barely absorb alcohol aroma substances. Therefore, the packaging materials formed of polyolefin resins are liable to change the proportions of the aroma substances contained in the products packaged therewith and thus change the aroma of the products, thereby significantly reducing the commercial value of the products.

The permeation or diffusion of the aroma substances contained in a film to the outside of the film can be prevented by laminating aluminium foil on the inside surface of the film. Recently, instead of aluminium, a plastic film having a good gas-barrier characteristic is laminated on the film.

However, even if permeation and diffusion of aroma substances is prevented, absorption of aroma substances of a packaged product into the resin forming the innermost layer of the packaging material is inevitable as long as a food containing aroma substances is in contact with the surface of the innermost material, which surface easily absorbs the aroma substances.

Another important characteristic required for a packaging material is a characteristic for sealing a product packaged therewith. For a good sealing characteristic, a film resin having good heat-sealing characteristics is used.

Known general-purpose resins, such as polypropylene, intermediate or low-pressure polyethylene, or high-pressure polyethylene, having excellent film-formabilities easily absorb large amounts of terpene hydrocarbon aroma substances. Therefore, these resins can not be suitably used as the above-described resins which do not substantially absorb aroma substances.

An ethylene-vinyl alcohol copolymer having a vinyl alcohol component (referred to as "EVOH" hereinafter) significantly prevents absorption of aroma substances thereinto but has a poor heat-seal characteristic. Thus, EVOH is not very suitable as an inside-laminate material of a film-type packaging material. As an EVOH having a vinyl alcohol content of less than 25 mol % lacks sufficient gas barrier characteristics and because an EVOH having a vinyl alcohol content of more than 75 mol % cannot be extrusion-formed in substantially the same manner as polyolefin, an EVOH having a vinyl alcohol content of 25-75 mol % is normally selected in order to achieve good gas barrier characteristics. Such an EVOH can be extrusion-formed in substantially the same manner as polyolefin resins and can substantially prevent gas permeation. In fact, such an EVOH is often used for those purposes. However, because such an EVOH lacks the good heat-sealing characteristics required for an inside-laminate material of a film-type packaging material, it has hardly ever been used as an inside-laminate material of a heat-seal packaging material.

On the contrary, aromatic polyesters have good characteristics for preventing absorption of aroma substances thereinto but poor heat-sealing characteristics. Therefore, the aromatic polyesters have hardly been used as inside-laminate materials for heat-seal packaging materials.

Thus, it has become apparent that there is a great need for development of an inside-laminate material for a film-type wrapping material which is excellent in these two contradictory characteristics, that is, the characteristic for preventing absorption of flavor substances and the characteristic for heat-sealing.

Due to the broader use of plastic wrapping materials, there is a possibility that the resulting large amount of plastic waste may pollute rivers, oceans and soils. To prevent this possible pollution, there is a great expectation regarding the development of plastics which can be biologically degraded.

An object of the present invention is to provide an aliphatic polyester sheet formed of a material containing as a main component a biodegradable aliphatic polyester, the material having molecular weights high enough for practical use of the sheet, which sheet has substantial biodegradability and excellent mechanical properties, for example, excellent heat stability and tensile strength.

Further, another object of the present invention is to provide a polyester stretched sheet formed by using the above aliphatic polyester.

Furthermore, another object of the present invention is to provide a polyester sheet which is formed by using the above aliphatic polyester and which can be suitably used as an inside-laminate material for a film-type packaging material having both good characteristics for preventing absorption of aroma substances and good characteristics for heat-sealing.

SUMMARY OF THE INVENTION

As a result of intensive studies on the reaction conditions for producing polyesters having sufficiently high molecular weights for practical use and substantial biodegradability, the present inventors have obtained specific aliphatic polyesters having molecular weights high enough for practical use of the sheet, and have found that the sheets and stretched sheets formed of these polyesters have substantial biodegradability, excellent mechanical properties, such as excellent heat stability and mechanical strengths, thus achieving the present invention.

Further, the present inventors found that the sheets formed by the above aliphatic polyester has both a good characteristic for preventing absorption of flavor substances and a good characteristic for heat-sealing, thus achieving the present invention.

The present invention provides: (A) a sheet which has been formed of a material containing as a main component an aliphatic polyester having a melting point of 70°–190° C., a melt viscosity of $1.0 \times 10^3$–$1.0 \times 10^6$ poises at a temperature of 190° C. and a shear rate of 100 sec$^{-1}$.

Further, the present invention provides the (A) sheet wherein said sheet is a stretched sheet formed by extruding and then stretching as a main component the above aliphatic polyester.

Furthermore, the present invention provides the (A) sheet wherein said sheet has a d-limonene distribution ratio of 6 or lower and an n-octane distribution ratio of 7 or lower.

DETAILED DESCRIPTION OF THE INVENTION

The present invention will be described below in further detail.

The aliphatic polyester of the present invention mainly consists of a polyester obtained by reacting two components of glycols and dicarboxylic acid (or acid anhydrides thereof), and if necessary as a third component, with at least one polyfunctional component selected from the group consisting of trifunctional or tetrafunctional polyols, oxycarboxylic acids, and polybasic carboxylic acids (or acid anhydrides thereof). The aliphatic polyesters are prepared by reacting relatively high molecular weight polyester prepolymers which have hydroxyl groups at ends with a coupling agent so as to make them even higher molecular weight polymer.

It has been known to obtain polyurethane by reacting a low molecular weight polyester prepolymer having a number-average molecular weight of 2,000–2,500, which have hydroxyl groups as the terminal groups, with diisocyanate as a coupling agent in the preparation of rubbers, foams, coatings and adhesives.

However, the polyester prepolymers used in these polyurethane foams, coatings and adhesives are prepolymers having a low molecular weight and a number-average molecular weight of 2,000–2,500 which is the maximum that can be prepared by non-catalytic reaction. To obtain practical physical properties as the polyurethane, it is necessary that the content of diisocyanate should be as much as 10–20 parts by weight in relation to 100 parts by weight of this low molecular weight prepolymer. When such a large amount of diisocyanate is added to the low molecular weight polyester melted at 150° C. or higher, gelation occurs so that no normal resins which can be molded in the form of a melt can be obtained.

Therefore, polyesters which are obtained by reacting a large amount of diisocyanate with a low molecular weight polyester prepolymers as a raw material cannot be used as the plastic raw material for the sheets of the present invention.

Also, as shown in the case of polyurethane rubbers, although a method is coceivable in which hydroxyl groups are converted into isocyanate groups by the addition of diisocyanate, and then the number-average molecular weight thereof is further increased by using glycols, the same problem as mentioned above arises because 10 parts by weight of diisocyanate relative to 100 parts by weight of the prepolymer should be used in order to obtain practical physical properties.

When a relatively high molecular weight polyester prepolymer is to be used, heavy metal catalysts required to prepare the prepolymer would promote the reactivity of the above-mentioned isocyanate groups to undesirably cause poor preservativity, generation of crosslinking and branching; hence a number-average molecular weight of not more than around 2,500 of polyester prepolymers would be the limit if they were to be prepared without catalysts.

The polyester prepolymers to obtain the aliphatic polyesters used in the present invention are relatively high molecular weight saturated aliphatic polyesters having substantially hydroxyl groups at the ends thereof, number-average molecular weights of at least 5,000, preferably at least 10,000, and melting point of 60° C. or higher, which are obtained by reacting glycols and dibasic carboxylic acids (or acid anhydrides thereof) in the presence of catalysts. When a prepolymer having a number-average molecular weight of lower than 5,000 is used, the small amounts of 0.1–5 parts by weight of coupling agents used in the present invention cannot provide poyesters for sheet forming having good physical properties. When polyester prepolymers having number-average molecular weights of 5,000 or higher are used, with hydroxyl values of 30 or less, the use of small amounts of coupling agents even under severe conditions such as a molten state and the like can produce high molecular weight polyesters without gelation as the reaction is not affected by remaining catalyst.

Therefore, the polymer for the sheets of the present invention has a repeated chain structure in which a polyester prepolymer having a number-average molecular weight of 5,000 or more, preferably 10,000 or more and consisting of an aliphatic glycol and aliphatic dicarboxylic acid is combined through the urethane bonds derived from, for example, diisocyanate as a coupling agent.

Further, the polymer for the sheets of the present invention has a repeated chain structure in which the above-mentioned polyester prepolymer provided with branched long chains derived from polyfunctional components is combined through the urethane bonds derived from, for example, diisocyanate as a coupling agent. When oxazoline, epoxy compounds, and acid anhydrides are used as a coupling agent, the polyester prepolymer has a repeated chain structure through ester bonds.

The aliphatic polyester sheet of the present invention is biodegraded when buried in soil or the like, generates less heat than polyethylene and polypropylene when burned, and has excellent tensile strength and impact strength. Therefore, sheets according to the present invention are suitable for packaging sheets and general-purpose sheets.

Further, the polyester stretched sheet of the present invention exhibits good biodegradability when buried in soil or the like and has excellent mechanical properties, for example, excellent tensile strength and tear strength, and transparency. Thus, the stretched sheets of the present invention are suitable as packaging sheets.

Furthermore, the sheet of the present invention which has a d-limonene distribution ratio of 6 or lower and an n-octane distribution ratio of 7 or lower, exhibits good biodegradability when buried in soil of the like, has low absorbance of aroma, good heat sealability and formability. Thus, the sheets of the present invention are suitable for a variety of uses, for example, packaging and/or container materials for liquids containing very small amounts of aroma components (for example, juice), packaging and/or container materials for alcoholic drinks, and packaging and/or container materials for soup.

Examples of glycols which can be used as a reaction component include aliphatic glycols. Among them those having a straight chain alkylene group with even number carbon atoms of 2, 4, 6, 8 and 10 such as: ethylene glycol, 1,4-butanediol, 1,6-hexanediol, 1,8-octanediol, 1,10-decanediol, and mixtures thereof are preferable.

Of these glycols, those having a smaller number of carbon atoms, such as ethylene glycol, 1,4-butanediol and 1,6-hexanediol, are preferable because they can produce an aliphatic polyester having a high crystallinity and a high melting point. In particular, ethylene glycol and 1,4-butanediol are most suitable because they produce good results.

Examples of aliphatic dicarboxylic acids or anhydrides thereof which provide aliphatic polyester by reacting with glycols include aliphatic dicarboxylic acids. Among them those having a straight chain alkylene group with even number carbon atoms of 2, 4, 6, 8 and 10 such as: succinic acid, adipic acid, suberic acid, sebacic acid, 1,10-decanedicarboxylic acid, succinic anhydride and mixtures thereof are preferable. Of these dicarboxylic acids, those having a smaller number of carbon atoms, such as succinic acid, adipic acid and succinic anhydride, are preferable because they can produce an aliphatic polyester having high crystallinity and high melting points. In particular, succinic acid, succinic anhydride and an acid mixture of succinic acid or succinic anhydride and another dicarboxylic acid such as adipic acid, suberic acid, sebacic acid or 1,10-decanedicarboxylic acid are preferable.

In the system of an acid mixture containing two or more acid components, for example, succinic acid and other dicarboxylic acids, the mixing ratio of succinic acid is at least 70 mol %, preferably at least 90 mol %, and the mixing ratio of the other carboxylic acids is 30 mol % or less, preferably 10 mol % or less.

A combination of 1,4-butanediol and succinic acid or succinic anhydride and a combination of ethylene glycol and succinic acid or succinic anhydride are particularly preferable for the present invention because the combinations exhibit melting points close to that of polyethylene. (Third component)

To these glycols and dicarboxylic acid, if necessary, may be added as a third component at least one polyfunctional component selected from the group consisting of trifunctional or tetrafunctional polyols, oxycarboxylic acid, and polybasic carboxylic acids (or acid anhydrides thereof). The addition of this third component, which causes the branching of long chains, can impart desirable properties in molten state to the polyester prepolymer, because the ratio of weight-average molecular weight (MW)/number-average molecular weight (Mn), i.e., the molecular weight distribution, increases with increases in its molecular weight.

In terms of the amount of polyfunctional components to be added without fear of gelation, a trifunctional component of 0.1–5 mole %, or a tetrafunctional component of 0.1–3 mole % is added relative to 100 mole % of the total of aliphatic dicarboxylic acid (or acid anhydride thereof) components.

Polyfunctional components

Examples of polyfunctional components as the third component include trifunctional or tetrafunctional polyols, oxycarboxylic acids, and polybasic-carboxylic acids.

The trifunctional polyols representatively include trimethylol propane, glycerin or anhydrides thereof. The tetrafunctional polyols representatively include pentaerythritol.

The trifunctional oxycarboxylic acid components are divided into the two types of (i) a component which has two carboxyl groups and one hydroxyl group in one molecule, and (ii) another component which has one carboxyl group and two hydroxyl groups in one molecule. Malic acid which has two carboxyl groups and one hydroxyl group in one molecule becomes practical and sufficient to the purposes of the present invention in view of commercial availability at low cost.

The tetrafunctional oxycarboxylic acid components are the following three types of components:

(i) A component which has three carboxyl groups and one hydroxyl group in one molecule;

(ii) Another component which has two carboxyl groups and two hydroxyl group in one molecule; and (iii) The remaining component which has three hydroxyl groups and one carboxyl group in one molecule. Any type can be used, though in view of commercial availability at low cost, citric acid and tartaric acid are practical and sufficient to the purposes of the present invention.

As a trifunctional polybasic carboxylic acid (or acid anhydride thereof) component trimesic acid, propane tricarboxylic acid and the like can be used. Among them, trimesic anhydride is practical for the purposes of the present invention.

As a tetrafunctional polybasic carboxylic acid (or anhydride thereof) various types of aliphatic compounds, cycloaliphatic compounds, aromatic compounds and the like, described in certain literatures, can be used. In view of commercial availability, for example, pyromellitic anhydride, benzophenone tetracarboxylic anhydride and cyclopentane tetracarboxylic anhydride are practical and sufficient to the purposes of the present invention.

These glycols and dibasic acids are mainly consisted of aliphatic series, while small amounts of other components, for example, aromatic series may be concomitantly used. These other components may be blended or copolymerized in amounts up to 20% by weight, preferably up to 10% by weight, and more preferably up to 5% by weight because using these compounds degrades biodegradability.

The polyester prepolymer for aliphatic polyesters to be used in the present invention has hydroxyl groups at the terminals. To introduce the hydroxyl groups, it is necessary that glycols are used somewhat excessively.

For preparation of the polyester prepolymer having a relatively high molecular weight, it is necessary to use deglycol-reaction catalysts in the deglycol reaction subsequent to the esterification. Examples of the deglycol-reaction catalysts include titanium compounds such as acetoacetoyl type titanium chelate compounds and organic alkoxy titanium compounds and the like. These titanium compounds can be used in combination. Examples of compounds used in combination include diacetoacetoxy oxytitanium (Nippon Chemical Industry Co., Ltd.; Nursem Titanium) tetraethoxy titanium, tetrapropoxy titanium, tetrabutoxy titanium and the like. The amount of the titanium compound used is 0.001–1 part by weight, and preferably 0.01–0.1 part by weight relative to 100 parts by weight of the polyester prepolymer. These titanium compounds may be blended before the esterification, or may be blended immediately before the deglycol-reaction.

To the polyester prepolymer which has a number-average molecular weight of at least 5,000, preferably at least 10,000, and whose terminal groups are substantially hydroxyl groups are added coupling agents in order to increase its number-average molecular weight.

Examples of the coupling agents include diisocyanate, oxazoline, diepoxy compounds, acid anhydrides and the like. Diisocyanate is particularly preferred.

In the cases of oxazoline and diepoxy compounds, it is necessary that the terminal hydroxyl groups are reacted with acid anhydrides and the like to convert them into carboxyl groups, then coupling agents are used.

Although not limited, examples of diisocyanate include 2,4-tolylene diisocyanate, a mixture of 2,4-tolylene diisocyanate and 2,6-tolylene diisocyanate, diphenylmethane diisocyanate, 1,5-naphthylene diisocyanate, xylylene diisocyanate, hydrogenated xylylene diisocyanate, hexamethylene diisocyanate, isophorone diisocyanate and the like. Particularly, hexamethylene diisocyanate is preferably used in terms of hue of prepared resins, reactivity at the time of blending polyesters, and the like.

The adding amounts of these coupling agents are 0.1–5 parts by weight, and preferably 0.5–3 parts by weight relative to 100 parts by weight of polyester prepolymer. Addition of less than 0.1 part by weight causes insufficient coupling reaction, whereas with more than 5 parts by weight gelation tends to occur.

The addition is preferably performed when the polyester is in a uniformly melted state under easily stirrable conditions. Although it is not impossible for the coupling agents to be added to the polyester prepolymer in the form of a solid and melted and mixed through an extruder, adding the agents in a polyester preparation unit, or adding them to polyester prepolymer in a melt state (for example, in a kneader) is more practical.

An aliphatic polyester used according to the present invention needs to have a specific melt characteristic in order to be formed into a sheet by melt forming. Accordingly, the melt viscosity thereof at a temperature of 190° C. and a shear rate of 100 sec$^{-1}$ should be $1.0 \times 10^3$–$1.0 \times 10^6$ poises, preferably $5.0 \times 10^3$–$5.0 \times 10^5$ poises, and more preferably $6.0 \times 10^3$–$1.0 \times 10^5$ poises.

If the melt viscosity is lower than $1.0 \times 10^3$ poises, the viscosity is too low, thus making sheet forming very difficult, and with higher than $1.0 \times 10^6$ poises, extrusion formation of the aliphatic polyester becomes difficult.

The melt viscosity at a shear rate of 100 sec$^{-1}$ was calculated of 100 sec$^{-1}$ was calculated from a graph which shows the relationship between the apparent viscosities and the shear rates measured by a capillary rheometer using a nozzle having a diameter of 1.0 mm and L/D of 10 at a resin temperature of 190° C.

The melting point of the aliphatic polyester to be used in the present invention needs to be 70°–190° C. preferably 70°–150° C., and more preferably 80°–135° C. A melting point lower than 70° C. will give the sheet poor heat resistance, whereas with higher than 190° C. it is difficult to carry out sheet forming.

To achieve a melting point higher than 70° C. the polyester prepolymer need to have a melt temperature of at least 60° C.

When urethane bonds are contained in the aliphatic polyester to be used in the present invention, the amount of urethane bonds is 0.03–3.0% by weight, preferably 0.05–2.0% by weight, and more preferably 0.1–1.0% by weight.

The amount of urethane bonds is measured by $^{13}$C NMR, showing good correlation with the charged amount.

Less than 0.03% by weight of urethane bonds has a little effect on polymerization and leads to poor molding properties, whereas more than 3% by weight causes gelation.

It is needless to say that when the above-mentioned aliphatic polyester is used to obtain the sheet according to the present invention, if necessary, lubricants, waxes, coloring agents and crystallizing promoters as well as antioxidants, thermal stabilizers, UV absorbers and the like can be used concomitantly.

That is, antioxidants include hindered phenol antioxidants such as p-tert-butyl hydroxytoluene and p-tertbutyl hydroxyanisole, sulfur antioxidants such as distearyl thiodipropionate and dilauryl thiodipropionate, and the like; heat stabilizers include triphenyl phosphite, trilauryl phosphite, trisnonylphenyl phosphite and the like; UV absorbers include p-tert-butyl phenyl salicylate, 2-hydroxy-4-methoxybenzophenone, 2-hydroxy-4-methoxy-2'-carboxybenzophenone, 2,4,5-trihydroxybutylophenone and the like; lubricants include calcium stearate, zinc stearate, barium stearate, sodium palmitate and the like; antistatic agents include N,N-bis(hydroxyethyl)alkyl amine, alkyl amine, alkyl allyl sulfonate, alkyl sulfonate and the like; flame retarders include hexabromocyclododecane, tris-(2,3-dichloropropyl) phosphate, pentabromophenyl allyl ether and the like; inorganic fillers include calcium carbonate, silica, titanium oxide, talc, mica, barium sulfate, alumina and the like; crystallizing promoters include polyethylene terephthalate, poly-trans-cyclohexane dimethanol terephthalate and the like; reinforcing fibers include inorganic fibers such as glass fiber, carbon fiber, boron fiber, silicon carbide fiber, graphite fiber, alumina fiber and amorphous fiber, and organic fibers such as aramide fiber, and the like.

An aliphatic polyester sheet according to the present invention can be formed by various forming methods such as the calender method, the T-die method or the circular die method. If the calender method is employed, the suitable resin temperature is 100°-270° C., preferably 100°-250° C. If the resin temperature is higher than 270° C., the resin inconveniently deteriorates. If the T-die method is employed, the suitable extruding temperature is 100°-270° C., preferably 100°-250° C. If the extruding temperature is lower than the melting point, the viscosity becomes too high, making sheet-forming difficult. If it is higher than 270° C., the resin deteriorates, causing various inconveniences.

The sheet of the present invention has a tensile breaking strength of at least 350 kg /cm$^2$ with respect to both the MD and TD directions, a breaking extension of at least 200%, and a rigidity of 4,000 kg/cm$^2$. The sheet has excellent mechanical properties: a ratio of the breaking extension in the MD direction to that in the TD direction, $E_{MD}/E_{TD}=0.7-3.0$; and a dart impact strength of 750 μm at 23° C., 100 Kg·cm or greater. Further, the combustion heat of the sheet is 7,000 Kcal/kg or less, which is lower than those of polyethylene and polypropylene, thus facilitating incineration thereof.

The tensile properties were determined according to JIS K7113, and the dart impact strength was determined according to JIS D1709. The determinations were converted on the basis of a sheet thickness of 750 μm. The stiffness was determined by using an Olsen stiffness meter (ASTM D747). The heat of combustion was determined by calorimetry according to JIS M8814.

An aliphatic polyester according to the present invention having a number average molecular weight of at least 10,000, preferably at least 20,000, a melting point of 70°-190° C. and a crystalline characteristic, can be formed into tough sheets. Such sheets can be used for wrapping and/or container materials or general-purpose plastic sheets.

The stretched sheet of the present invention can be produced by various forming methods according to the conventional art. For example, in order to form a stretched sheet by a consecutive biaxial stretching method, the aliphatic polyester is heat-melted and extruded through a T-die by an extruder so as to be formed into a film. Then, the film is quenched on a casting roller according to a known casting method such as electrostatic peening, thus obtaining a sheet having practically no orientation. This unstretched sheet is stretched by two to fourfold by a roller longitudinal stretcher and, subsequently, stretched by three to fivefold by a tenter transverse stretcher. The resultant sheet may be heat-treated if desired, whereupon the sheet is subsequently cooled slowly while being continuously rolled up to thus produce the final sheet.

The sheet can also be produced by other methods such as a tenter simultaneous biaxial stretching method or a tubular method. Further, the sheet can also be produced by a method in which the longitudinal and transverse stretching rates are varied as desired, as well as a method in which the sheet is stretched in either the longitudinal or transverse directions. The sheet may be subjected to a surface treatment, such as corona treatment, in order to enhance its affinity to printing inks or adhesion to other films (for example, a sealant film).

The suitable stretching ratio on the basis of area is 1.5 or greater, preferably 2-fold or greater, and more preferably 2.5-fold or greater. A stretching ratio smaller than 1.5-fold is unsuitable, because if it is smaller than 1.5-fold, the mechanical properties of the stretched sheet will be practically no better than those of an unstretched sheet. Though a higher stretching ratio is more preferable, a normal upper limit is 30-fold. The stretching impacts the sheet transparency, so the method can be applied to good where transparency is required.

The thickness of the stretched sheet of the present invention is 7-2,000 μm, preferably 20-1,000 μm, and more preferably 50-700 μm.

A sheet thinner than 7 g m makes forming difficult, and a sheet thicker than 2,000 g m can not be easily used.

A stretched sheet according to the present invention having a tensile breaking strength of 10 kg/mm$^2$ or greater and a tear strength of 2 kg/cm$^2$ or greater can be used as a wrapping material or a general-purpose plastic sheet.

Further, the aliphatic polyester sheet of the present invention can be easily formed in a container-shape, by normal methods such as vacuum forming, pressure forming and heat-plate heating type pressure forming. The d-limonene distribution ratio and the n-octane distribution ratio are used as indexes for absorption of aroma substances. The suitable d-limonene distribution ratio is 6 or lower, preferably 5 or lower, and more preferably 4 or lower. The suitable n-octane distribution ratio is 7 or lower, preferably 6 or lower, and more preferably 5 or lower.

If the d-limonene distribution ratio is higher than 6 or if the n-octane distribution ratio is higher than 7, the proportions of aroma substances substantially deviate from one another, causing substantially a large change in the aroma of a product wrapped with the sheet.

The d-limonene distribution ratio and the n-octane distribution ratio are determined under conditions where an aqueous solution containing aroma substances (further containing 3 wt % sugar ester N-1170 as a solubilizer) is enclosed in a container which has been vacuum-formed of a sheet and is sealed with a lid formed by laminating aluminium foil having a thickness of 9 μm by using a urethane adhesive.

More specifically, the aqueous solution contains 300 ppm d-limonene and 300 PP, d-octane as aromatic components and is enclosed in a vacuum-formed container and stored at 23° C. for 50 days. After opening the container, the aroma components absorbed into the inside surfaces of the container and the lid are extracted by using ether, and the aroma components remaining in the aqueous solution are also extracted with ether. The absorbed and remaining amounts of each aroma component converted on the basis of its original concentration in the aqueous solution are determined by using gas chromatography. Using the resultant values, the distribution ratio regarding the aroma absorption is calculated on the basis of the following formula. The distribution ratio is defined by the following formula.

Distribution Ratio=Absorbed Amount/Remaining Amount

EXAMPLES

Methods of the present invention are illustrated with reference to the following examples, but the invention is not intended to be limited only thereto.

Example 1

A 700 L reactor was purged with nitrogen, then 183 kg of 1,4-butanediol and 224 kg of succinic acid were charged in it. After the temperature was elevated under nitrogen stream, esterification by dehydration condensation was carried out for 3.5 hr at 192°–220° C., and after ceasing nitrogen charge, for further 3,5 hr under reduced pressures of 20–2 mm Hg. A sample collected had an acid value of 9.2 mg/g, a number-average molecular weight (Mn) of 5,160 and a weight average molecular weight (Mw) Of 10,670. Subsequently, 34 g of tetraisopropoxy titanium, a catalyst, was added at normal pressures under nitrogen stream. The temperature was elevated to carry out a deglycol-reaction at temperatures of 215°–220° C. under reduced pressures of 15–0.2 mmhg for 5.5 hr. A sample collected had a number-average molecular weight (Mn) of 16,800 and a weight average molecular weight (Mw) of 43,600. The yield of resulting polyester prepolymer (A1) was 339 kg except condensate water.

5.42 kg of hexamethylene diisocyanate was added to the reactor containing 339 kg of the polyester prepolymer (A1) to perform a coupling reaction for 1 hr at 180°–200° C. The viscosity was rapidly increased, but no gelation occurred. Then, 1.70 kg of Irganox 1010 (Ciba-geigy) as an antioxidant and 1.70 kg of calcium stearate as a lubricant were added, and the mixture was further stirred for 30 min. The resulting reaction product was extruded into water, and cut by a cutter into pellets. The aliphatic polyester (B1) obtained after drying in a vacuum at 90° C. for 6 hr had a yield of 300 kg.

The obtained polyester (B1) was a slightly ivorylike white, waxy crystal, and had a melting point of 110° C., a number-average molecular weight (Mn) of 35,500 a weight-average molecular weight (Mw) of 170,000, a MFR (190° C.) of 1.0 g/10 min, a viscosity of 230 poises in a 10% orthochlorophenol solution and a melt viscosity of $1.5 \times 10^4$ poises at a temperature of 190° C. at a shear rate of 100 sec$^{-1}$. The average molecular weight was measured by a Shodex GPC System-11 (Showa Denko, gel permeation chromatography) using a HFIPA solution containing 5 mmol CF$_3$COONa (concentration of 0.1% by weight) as a medium. A calibration curve was drawn using a PMMA standard sample (Shodex Standard M-75, Showa Denko).

Polyester (B1) was extruded from a T-die having a width of 350mm (a lip gap of 1.0 mm) at a resin temperature of 170° C. by employing an L/D=32 extruder having a screw diameter of 40 mm$\phi$. A sheet was formed with first and second cooling rolls having at a temperature of 60° C. so that a sheet having a thickness of approximately 750 $\mu$m was produced. There were no problems regarding formation of the sheet. The evaluation results of the resulting sheet and container are shown in Table 1 and 2.

To evaluate the biodegradability of the sheets according to the examples 1-8 and comparative examples 1 and 2, samples of the sheets each having a size of 10 cm×20 cm were placed between stainless-steel frames having polyethylene nets provided over the window openings, and then the samples were buried under 10 cm of earth. After three months, the samples were uncovered, and their biodegradability was evaluated and this was compared with the biodegradability of a commercially available paper board.

Preferably, a sample should be in the state (A), below when evaluated. State (A): a sheet sample is degraded further than the paper, and substantially worn out with many holes formed. State (B): a sheet sample is degraded less than the paper, and retains substantial strength.

Example 2

A sheet was formed under substantially the same conditions as in (Example 1), except that the resin temperature was maintained at 190° C. There were no problems regarding formation of the sheet.

The results of the physical property determinations of the thus-obtained sheet are shown in Table 1 and Table 2.

Example 3

A sheet having a thickness of about 500 $\mu$m was formed under substantially the same conditions as in (Example 1). There were no problems regarding formation of the sheet.

The results of the physical property determinations of the thus-obtained sheet are shown in Table 1 and Table 2.

Example 4

A 700 L reactor was purged with nitrogen, then 177 kg of 1,4-butanediol, 198 kg of succinic acid and 25 kg of adipic acid were charged in it. After the temperature was elevated under nitrogen stream, esterification by dehydration condensation was performed for 3.5 hr at 190°–210° C., and after ceasing nitrogen charge, for further 3.5 hr under reduced pressures of 20–2 mmhg. A sample collected had an acid value of 9.6 mg/g, a number-average molecular weight (Mn) of 6,100 and weight-average molecular weight (Mw) of 12,200. Subsequently, 20 g of tetraisopropoxy titanium, a catalyst, was added at normal pressures under nitrogen stream. The temperature was elevated to perform a deglycol-reaction at temperatures of 210°–220° C. under reduced pressures of 15–0.2 mmhg for 6.5 hr. A sample collected had a number-average molecular weight (Mn) of 17,300 and a weight-average molecular weight (Mw) of 46,400. The resulting polyester (A2) had a yield of 337 kg except condensate water.

4.66 kg of hexamethylene diisocyanate was added to the reactor containing 337 kg of polyester (A2) to perform a coupling reaction for 1 hr at 180°–200° C. The viscosity was rapidly increased, but no gelation occurred. Then, 1.70 kg of Irganox 1010 (Ciba-Geigy) as an antioxidant and 1.70 kg of calcium stearate as a lubricant were added, and the mixture was further stirred for 30 min. The resulting reaction product was extruded into water by an extruder, and cut by a cutter into pellets. The aliphatic polyester (B2) obtained after drying in a vacuum at 90° C. for 6 hr had a yield of 300 kg.

The obtained polyester (B2) was a slightly ivorylike white, waxy crystal, and had a melting point of 103° C., a number-average molecular weight (Mn) of 36,000, a weight-average molecular weight (Mw) of 200,900, a MFR (190° C.) of 0.52 g/10 min, a viscosity of 680 poises in a 10% orthochlorophenol solution and a melt viscosity of $2.2 \times 10^4$ poises at a temperature of 190° C. at a shear rate of 100 sec$^{-1}$.

The polyester (B2) was formed into a sheet in substantially the same manner as in (Example 1). There were no problems regarding formation of the sheet.

The results of the physical property determinations of the thus-obtained sheet are shown in Table 1 and Table 2.

Example 5

The polyester (B2) was formed-into a sheet under substantially the same conditions as in (Example 1), except that the resin temperature was maintained at 190° C. There were no problems regarding formation of the sheet.

The results of the physical property determinations of the thus-obtained sheet are shown in Table 1 and Table 2.

Example 6

The polyester (B2) was formed into a sheet having a thickness of about 500 μm under substantially the same conditions as in (Example 1). There were no problems regarding formation of the sheet.

The results of the physical property determinations of the thus-obtained sheet are shown in Table 1 and Table 2.

Example 7

A 700 L reactor was purged with nitrogen, then 145 kg of ethylene glycol, 251 kg of succinic acid and 4.1 kg of citric acid were charged in it. After the temperature was elevated under nitrogen stream, esterification by dehydration condensation was performed for 3.5 hr at 190°-210° C., and after ceasing nitrogen charge, for further 5.5 hr under reduced pressures of 20-2 mmhg. A sample collected had an acid value of 8.8 mg/g, a number-average molecular weight (Mn) of 6,800 and a weight-average molecular weight (Mw) of 13,500. Subsequently, 20 g of tetraisopropoxy titanium, a catalyst, was added at normal pressures under nitrogen stream. The temperature was elevated to perform a deglycol-reaction at temperatures of 210°-220° C. under reduced pressures of 15-0.2 mmhg for 4.5 hr. A sample collected had a number-average molecular weight (Mn) of 33,400 and a weight-average molecular weight (Mw) of 137,000. The resulting polyester (A3) had a yield of 323 kg except condensate water.

3.23 kg of hexamethylene diisocyanate was added to the reactor containing 323 kg of polyester (A3) to perform a coupling reaction for 1 hr at 180°-200° C. The viscosity was rapidly increased, but no gelation occurred. Then, 1.62 kg of Irganox 1010 (Ciba-Geigy) as an antioxidant and 1.62 kg of calcium stearate as a lubricant were added, and the mixture was further stirred for 30 min. The resulting reaction product was extruded into water by an extruder, and cut by a cutter into pellets. The polyester (B3) obtained after drying in a vacuum at 90° C. for 6 hr had a yield of 300 kg.

The obtained polyester (B3) was a slightly ivory-like white, waxy crystal, and had a melting point of 96° C., a number-average molecular weight (Mn) of 54,000, a weight-average molecular weight (Mw) of 324,000, a MFR (190° C.) of 1.1 g/10 min, a viscosity of 96 poises in a 10% orthochlorophenol solution and a melt viscosity of $1.6 \times 10^4$ poises at a temperature of 190° C. at a shear rate of 100 sec$^{-1}$.

The polyester (B3) was formed into a sheet in substantially the same manner as in (Example 1). There were no problems regarding formation of the sheet.

The results of the physical property determinations of the thus-obtained sheet are shown in Table 1 and Table 2.

Example 8

A 700 L reactor was purged with nitrogen, then 200 kg of 1,4-butanediol, 250 kg of succinic acid and 2.8 kg of trimethylol propane were charged in it. After the temperature was elevated under nitrogen stream, esterification by dehydration condensation was performed for 4.5 hr at 192°-220° C., and after ceasing nitrogen charge, for further 5.5 hr under reduced pressures of 20-2 mmhg. A sample collected had an acid value of 10.4 mg/g, a number-average molecular weight (Mn) of 4,900 and a weight average molecular weight (Mw) of 10,000. Subsequently, 37 g of tetraisopropoxy titanium, a catalyst, was added at normal pressures under nitrogen stream. The temperature was elevated to perform a deglycol-reaction at temperatures of 210°-220° C. under reduced pressures of 15-1.0 mmhg for 8 hr. A sample collected had a number-average molecular weight (Mn) of 16,900 and a weight-average molecular weight (Mw) of 90,300. The resulting polyester (A4) had a yield of 367 kg except condensate water of 76 kg.

3.67 kg of hexamethylene diisocyanate was added to the reactor containing 367 kg of polyester (A4) to perform a coupling reaction for 1 hr at 160°-180° C. The viscosity was rapidly increased, but no gelation occurred. Then, 367 g of Irganox 1010 (Ciba-Geigy) as an antioxidant and 367 g of calcium stearate as a lubricant were added, and the mixture was further stirred for 30 min. The resulting reaction product was extruded into water by an extruder, and cut by a cutter into pellets. The polyester (B4) obtained after drying in a vacuum at 90° C. for 6 hr had a yield of 350 kg.

The obtained polyester (B4) was a slightly ivorylike white, waxy crystal, and had a melting point of 110° C., a number-average molecular weight (Mn) of 17,900 a weight-average molecular weight (Mw) of 161,500 (Mw/Mn=9.5), a MFR (190° C.) of 0.21 g/10 min and a melt viscosity of $2.0 \times 10^4$ poises at a temperature of 190° C. at a shear rate of 100 sec$^{-1}$. The average molecular weight was measured in the same manner as in Example 1.

The polyester (B4) was formed into a sheet in substantially the same manner as in (Example 1). There were no problems regarding formation of the sheet.

The results of the physical property determinations of the thus-obtained sheet are shown in Table 1 and Table 2.

Comparative Example 1

Although the polyester (A1) was used for sheet formation in substantially the same manner as in Example 1, it failed to form a good sheet.

Comparative Example 2

The combustion heat and biodegradability of a commercially-available quenched polyethylene terephthalate sheet having a thickness of 750 μm and a crystallinity (determined by DSC method) of 4 % were determined. The combustion heat was as low as 5,500 kcal/kg, but the biodegradability was evaluated as state B.

Example 9

The polyester (B1) used in Example 1 was heated to melt at 160° C. in a 65 mmφ extruder and continuously extruded from a T-die so as to form a sheet shape, and subsequently cooled by a roller having a surface temperature of 50° C., thus obtaining a sheet having a thickness of 830 μm, and no orientation. The sheet was longitudinally stretched at a stretching ratio of fourfold by a roller longitudinal stretcher under conditions where the temperature of the sheet was 50° C. The longitudinally stretched sheet was immediately fed to a tenter transverse stretcher, where the sheet temperature was raised to 60° C. At this temperature, the sheet was transversely stretched at a ratio of fourfold. Subsequently, the sheet was subject to heat fixation treatment under conditions where the sheet temperature was 100° C., thus obtaining a biaxially stretched transparent sheet having a thickness of 50 μm.

The tensile properties of the thus-obtained sheet were determined under the conditions according to JIS C-2318. A breaking strength of 23–25 kg/mm$^2$ was obtained, indicating that the sheet was substantially tough. Further, the tear strength thereof was determined as 5.5 kg/cm$^2$ according to JIS P8112. The biodegradability thereof was evaluated as state A.

The evaluation of baiodegrdability in Examples 9–13 and comparative Examples 3–6 were carried out in the same manner as in Example 1 to 8 above, except that the burried samples were uncovered after 3 months.

Example 10

The polyester (B1) used in Example 1 was formed into a transparent sheet having a thickness of 210 μm under substantially the same conditions as in Example 1, except that a non-orientated sheet was stretched longitudinally and transversely at a ratio of twofold.

According to determination performed in substantially the same manner as in Example 9, the tensile breaking strength of the resultant sheet was 16–18 kg/mm$^2$, indicating that the sheet was substantially tough. Further, the tear strength of the sheet was 4.0 kg/cm$^2$.

The biodegradability thereof was evaluated as state A.

Example 11

The polyester (B2) used in Example 4 was formed into a sheet in substantially the same manner as in Example 9. The properties thereof were evaluated in substantially the same manner as in Example 9. As a result, the tensile breaking strength thereof was 19–21 kg /mm$^2$, indicating that the sheet was substantially tough. The tear strength thereof was 4.5 kg/cm$^2$.

The biodegradability thereof was evaluated as state A.

Example 12

The polyester (B2) was formed into a sheet under substantially the same conditions as in Example 9, except that the longitudinal stretching ratio of a non-oriented sheet was twofold.

It was determined that the tensile breaking strength of the resultant sheet was 11–16 kg/mm$^2$, indicating that the sheet was substantially tough. Further, the tear strength of the sheet was 2.2–3.5 kg/cm$^2$.

The biodegradability thereof was state A.

Example 13

The polyester (B4) used in Example 8 was formed into a sheet in substantially the same manner as in Example 9. The properties thereof were evaluated in substantially the same manner as in Example 1. As a result, the tensile breaking strength thereof was 17–19 kg/mm$^2$, indicating that the sheet was substantially tough. The tear strength thereof was 4.01 kg/cm$^2$.

The biodegradability thereof was state A.

Comparative Example 3

The polyester (B1) used in Example 1 was formed into a sheet under substantially the same conditions as in Example 9, except that the longitudinal and transverse stretching ratios of a non-oriented sheet were both 1.1-fold.

It was determined that the tensile breaking strength of the resultant sheet was 7–9 kg /mm$^2$, and the tear strength of the sheet was 1.5 kg/cm$^2$. The sheet had poor properties.

The biodegradability thereof was good, that is, state A.

Comparative Example 4

The polyester (B2) used in Example 4 was formed into a sheet under substantially the same conditions as in Example 9, except that the longitudinal and transverse stretching ratios of a non-oriented sheet were both 1.1-fold.

According to determination, the tensile breaking strength of the resultant sheet was 5–7 kg/mm$^2$, and the tear strength of the sheet was 1.2 kg/cm$^2$. The sheet had poor properties.

The biodegradability thereof was good, that is, state A.

Comparative Example 5

Although formation of a sheet by using the polyester (A1) in substantially the same manner as in Example 9 was attempted, a stretched sheet having sufficient properties or characteristics for actual use could not be obtained.

Comparative Example 6

The tensile breaking strength of a stretched sheet formed of a commercially available polyethylene terephthalate prepared by condensation polymerization of terephthalic acid and ethylene glycol was determined as 20–22 kg/mm$^2$. The tear strength thereof was 5–6 kg/cm$^2$.

The biodegradability thereof was state B. In fact, no biodegradation was observed.

Example 14

The polyester (B1) used in Example 1 was extruded at a resin temperature of 160° C. through a T-die (having a lip gap of 1.0 mm) having a width of 320 mm by using an extruder having a screw diameter 40 mm$\phi$ and L/D=32, and then formed into sheets having thicknesses of about 750 μm and 300 μm by using first and second cooling rollers having a temperature of 60° C.

The thus-produced polyester (B1) sheet having a thickness of about 750 g m was formed into a container having a capacity of 90 cc (L/D=0.4) by using a vacuum former made by Asano Kenkyusho.

This vacuum-formed container was laminated with aluminium foil having a thickness of 9 μm as the lid by using a urethane adhesive, thus enclosing therein an aqueous solution containing aroma components (the aqueous solution further containing 0.3 wt % sugar ester N-1170 as a solubilizer).

The aqueous solution contained the following aroma components: d-limonene and myrcene, as representatives of terpene hydrocarbons; n-octane as a representative of an organic hydrocarbon; linalol as a terpene alcohol compound; and ethyl caproate as an ester compound, the concentration of each of these components being 300 ppm. This solution was enclosed in the above-described vacuum-formed container and stored at 23° C. for 50 days. After opening the container, the aroma components absorbed into the inside surfaces of the container and the lid were extracted by using ether, and the aroma components remaining in the aqueous solution were also extracted with ether.

The absorbed and remaining amounts of each aroma component converted on the basis of its original concentration in the aqueous solution were determined, by using gas chromatography. Using the resultant values, the distribution ratio regarding the aroma absorption was calculated on the basis of the following formula. The distribution ratio is defined by the following formula (1).

Distribution Ratio=Absorbed Amount/Remaining Amount (1)

A larger distribution ratio means stronger aroma absorption. If the distribution ratio is 1, half of the amount of the aroma originally contained in the aqueous solution before being enclosed in the pouch is absorbed in the inside surface of the pouch. As the distribution ratio increases over 1, the concentration of aroma remaining in the aqueous solution decreases. The aroma absorption thus evaluated is shown in Table 1.

Evaluation of the Heat-seal Characteristics

The heat-seal characteristics were determined on the basis of a sealing temperature achieving a heat-seal strength of 500 g, which was determined by peeling heat-sealed sheets (750 μm and 330 μm) under certain peeling conditions (a film width of 15 mm, a peeling rate of 300 mm/min. an angle of 180°. The heat-sealing conditions were: a sealing time of 1 second, and a pressure of 2 Kg/cm². The result is shown in Table 4.

Biodegradability Evaluation

The sheet was observed to be in state A.

The evaluation of biodegradability for Example 14–15 and Comparative Examples 7 were carried out in the same manner as in the Examples 1-8, except that sheet were 330 μm thick, and control sample was a upper grade paper, and samples were uncovered after 1 year.

Example 15

From the polyester (B4) used in Example 8, after forming a sheet in the same manner as in Example 14, a container was vacuum-formed. The container was evaluated for aroma absorption and heat-sealability. Results are shown in Table 3 and 4.

Biodegradability was also evaluated to find state A.

Comparative Example 7

A commercially available polyethylene terephthalate was extruded by a conventional T-die film forming method so as to be formed into sheets having thicknesses of 750 μm and 300 μm. A vacuum-formed product was formed, and the distribution ratio and heat-seal temperature of the sheets were determined in substantially the same manners as in Example 1. The results are shown in Tables 3 and 4.

The biodegradability evaluation was state B. No biodegradation of the sheet was observed.

TABLE 1

| | Tensile Properties | | | | |
|---|---|---|---|---|---|
| | Strength at break (kg/cm²) | | Elongation at break (%) | | Ratio |
| | MD | TD | MD | TD | $E_{MD}/E_{TD}$ |
| Example | | | | | |
| 1 | 600 | 500 | 450 | 400 | 1.12 |
| 2 | 580 | 490 | 450 | 420 | 1.07 |
| 3 | 550 | 500 | 400 | 350 | 1.14 |
| 4 | 550 | 460 | 480 | 420 | 1.14 |
| 5 | 510 | 430 | 480 | 400 | 1.20 |
| 6 | 480 | 400 | 430 | 370 | 1.16 |
| 7 | 450 | 350 | 500 | 450 | 1.11 |
| 8 | 580 | 500 | 450 | 420 | 1.10 |
| Comparative Example | | | | | |
| 1 | No Good Sheet Formed | | | | |

TABLE 2

| | Stiffness (kg/cm²) | Dart Impact at 23° C. (kg · cm) | Combustion Heat (kcal/kg) | Biodegradability |
|---|---|---|---|---|
| Example | | | | |
| 1 | 6500 | 130 | 5700 | A |
| 2 | 6600 | 120 | 5700 | A |
| 3 | — | 120 | 5700 | A |
| 4 | 4800 | 150 | 5600 | A |
| 5 | 5000 | 140 | 5600 | A |
| 6 | — | 150 | 5600 | A |
| 7 | 4600 | 170 | 5600 | A |
| 8 | 5800 | 120 | 5700 | A |
| Comparative Example | | | | |
| 1 | No Good sheet Formed | | 5600 | A |
| 2 | — | — | 5500 | B |

TABLE 3

| | Distribution Ratio | | |
|---|---|---|---|
| | Example | | Comparative Example |
| Flavor Component | 14 | 15 | 7 |
| d-limonene | 2.3 | 2.5 | 7.0 |
| Myrcene | 4.6 | 4.4 | 6.1 |
| n-Octane | 1.9 | 1.8 | 10.7 |
| Linalol | 0.35 | 0.40 | 0.05 |
| Ethyl n-Caproate | 0.70 | 0.72 | 0.70 |

TABLE 4

| Heat Seal Temperature (°C.) | | |
|---|---|---|
| Example | | Comparative Example |
| 14 | 15 | 7 |
| 110 | 108 | Poor sealing at 240° C. or lower |

What is claimed is:

1. A polyester sheet comprising an aliphatic polyester having a melt viscosity of $1.0 \times 10^3$–$1.0 \times 10^6$ poises at a temperature of 190° C. and a shear rate of 100 sec$^{-1}$, and having a melting point of 70°–190° C.,
   wherein said aliphatic polyester is obtained by adding from 0.1 to 5 parts by weight of diisocyanate to 100 parts by weight of a prepolymer in a molten state, wherein said prepolymer is obtained from a reaction of at least an aliphatic glycol and an aliphatic dicarboxylic acid, wherein the reaction includes (a) succinic acid, or its anhydrides, reacted with 1,4-butanediol, (b) succinic acid, adipic acid, or their anhydrides, reacted with 1,4-butanediol, or (c) succinic acid, or its derivatives, reacted with ethylene glycol, and has a number-average molecular weight of at least 10,000.

2. A polyester as claimed in claim 1 wherein said sheet has a tensile strength at break of 350 kg/cm² or higher with respect to both the MD and TD directions, an extension at break of 200% or higher, and a stiffness of 4,000 kg/cm² or higher.

3. A polyester sheet as claimed in claim 1 wherein said sheet is a sheet which is made of the polyester by extrusion followed by stretching.

4. A polyester sheet as claimed in claim 1 wherein said sheet has a tensile strength at break of at least 10 kg/mm² and a tear propagation strength of at least 2 kg/cm².

5. A polyester sheet as claimed in claim 1 wherein said sheet has a d-limonene distribution ratio of 6 or lower and an n-octane distribution ratio of 7 or lower.

6. A polyester sheet as claimed in any one of claims 1 to 5 wherein the aliphatic polyester has a repeated chain structure in which a polyester prepolymer having a number-average molecular weight (Mn) of 10,000 or more and obtained by reacting the aliphatic glycol, the aliphatic dicarboxylic acid and, as a third component, at least one polyfunctional component selected from the group consisting of trifunctional or tetrafunctional polyols, oxycarboxylic acids and polybasic carboxylic acids or acid anhydrides thereof, is combined through a urethane bond.

7. A polyester sheet as claimed in claim 6 wherein the polyester prepolymer contains one or more compounds selected from the group consisting of trimethylol propane, glycerin and pentaerythritol as the trifunctional or tetrafunctional polyol of the third component.

8. A polyester sheet as claimed in claim 6 wherein the polyester prepolymer contains one or more compounds selected from the group consisting of malic acid, citric acid and tartaric acid as the trifunctional or tetrafunctional oxycarboxylic acid of the third component.

9. A polyester sheet as claimed in claim 6 wherein the polyester prepolymer contains one or more compounds selected from the group consisting of trimesic acid, propane tricarboxylic acid, trimellitic anhydride, pyromellitic anhydride, benzophenone tetracarboxylic anhydride and cyclopentane tetracarboxylic anhydride as the trifunctional or tetrafunctional polybasic carboxylic acid of the third component.

* * * * *